(12) United States Patent
Yamaguchi

(10) Patent No.: US 11,142,107 B2
(45) Date of Patent: Oct. 12, 2021

(54) VEHICLE SEAT

(71) Applicant: TOYOTA BOSHOKU KABUSHIKI KAISHA, Aichi (JP)

(72) Inventor: Takao Yamaguchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/088,070

(22) Filed: Nov. 3, 2020

(65) Prior Publication Data

US 2021/0138945 A1 May 13, 2021

(30) Foreign Application Priority Data

Nov. 8, 2019 (JP) .............................. JP2019-203255

(51) Int. Cl.
| | |
|---|---|
| *B60N 2/427* | (2006.01) |
| *B60N 2/68* | (2006.01) |
| *B60N 2/22* | (2006.01) |
| *B60N 2/20* | (2006.01) |

(52) U.S. Cl.
CPC .............. *B60N 2/682* (2013.01); *B60N 2/20* (2013.01)

(58) Field of Classification Search
CPC .... A47C 7/14; A47C 7/40; B60N 2/68; B60N 2/42709; B60N 2/42745; B60N 2/2222; B60N 2/4228
See application file for complete search history.

(56) References Cited

U.S. PATENT DOCUMENTS

| | | | | | |
|---|---|---|---|---|---|
| 5,333,932 | A | * | 8/1994 | Satoh .................... | B60N 2/0232 297/354.12 |
| 6,902,234 | B2 | * | 6/2005 | Becker ................. | B60N 2/0715 248/421 |
| 7,717,509 | B2 | * | 5/2010 | Kojima ................ | B60N 2/1615 297/216.2 |
| 8,998,325 | B2 | * | 4/2015 | Jonsson ............. | B60N 2/42727 297/344.17 |
| 9,352,666 | B2 | * | 5/2016 | Kaku ..................... | B60N 2/002 |
| 9,376,044 | B2 | * | 6/2016 | Fujita ....................... | B60N 2/62 |
| 2007/0194613 | A1 | * | 8/2007 | Kojima ................ | B60N 2/0705 297/344.15 |

(Continued)

FOREIGN PATENT DOCUMENTS

JP 2013-141901 A 7/2013

*Primary Examiner* — Shin H Kim
(74) *Attorney, Agent, or Firm* — Greenblum & Bernstein P.L.C.

(57) ABSTRACT

Disclosed is a vehicle seat including a first side frame, a second side frame, a first coupling member, a second coupling member, a recliner, a coupling plate, a first fastener and a second fastener to fix the coupling plate to the first side frame by fastening, a first reinforcer to reinforce a first portion, of the first side frame, located in an extending direction center thereof, and a second reinforcer to reinforce a second portion, of the first side frame, surrounding the second coupling member. The first side frame has a low-rigidity portion provided between the first fastener and the second fastener. A thickness of the low-rigidity portion is smaller than a sum of a thickness of the first portion and a thickness of the first reinforcer and than a sum of a thickness of the second portion and a thickness of the second reinforcer.

3 Claims, 10 Drawing Sheets

(56) References Cited

U.S. PATENT DOCUMENTS

| | | | | |
|---|---|---|---|---|
| 2012/0187735 A1* | 7/2012 | Foelster | ............... | B60N 2/164 |
| | | | | 297/344.17 |
| 2013/0161989 A1* | 6/2013 | Ito | ............... | B60N 2/1615 |
| | | | | 297/313 |
| 2013/0257117 A1* | 10/2013 | Seki | ............... | B60N 2/42745 |
| | | | | 297/216.1 |
| 2015/0145303 A1* | 5/2015 | Line | ............... | B60N 2/02 |
| | | | | 297/283.3 |
| 2015/0203011 A1* | 7/2015 | Fujita | ............... | B60N 2/22 |
| | | | | 297/284.11 |
| 2015/0352985 A1* | 12/2015 | Seki | ............... | B60N 2/42709 |
| | | | | 297/216.1 |
| 2016/0009209 A1* | 1/2016 | Cao | ............... | B60N 2/4249 |
| | | | | 297/354.12 |
| 2018/0023608 A1* | 1/2018 | Matsushima | ............... | F16B 37/043 |
| | | | | 411/37 |
| 2018/0281629 A1* | 10/2018 | Furukawa | ............... | B60N 2/10 |

\* cited by examiner

VEHICLE SEAT

CROSS-REFERENCE TO RELATED APPLICATIONS

This application claims the benefit of Japanese Patent Application No. 2019-203255 filed on Nov. 8, 2019 with the Japan Patent Office, the entire disclosure of which is incorporated herein by reference.

BACKGROUND

The present disclosure relates to a vehicle seat mounted in a vehicle.

Vehicle seats are each configured such that a seat cushion and a seatback are coupled to each other via a recliner as disclosed in, for example, Japanese Unexamined Patent Application Publication No. 2013-141901.

The seat cushion supports buttocks of an occupant. The seatback supports a back of the occupant. The recliner is a mechanism to switch between a rotatable state, in which a seatback frame is rotatable relative to the seat cushion in seat front-rear directions, and a non-rotatable state.

SUMMARY

When a force (moment) to rotate the seatback is applied to the seatback, a large load is inputted to the recliner and to a cushion frame that constitutes a framework of the seat cushion.

It is desirable that one aspect of the present disclosure provide a vehicle seat designed in consideration of a case where a large moment is applied to a seatback.

One aspect of the present disclosure is a vehicle seat with a seat cushion and a seatback. The vehicle seat comprises: a first side frame constituting a part of a framework of the seat cushion and extending in a seat front-rear direction, the first side frame being arranged at a first end, in a seat-width direction, of the seat cushion; a second side frame constituting a part of the framework of the seat cushion and extending in the seat front-rear direction, the second side frame being arranged at a second end, in the seat-width direction, of the seat cushion; a first coupling member coupling a front end of the first side frame and a front end of the second side frame to each other, the first coupling member extending in the seat-width direction; a second coupling member coupling a rear end of the first side frame and a rear end of the second side frame to each other, the second coupling member extending in the seat-width direction; a back frame constituting a framework of the seatback; a recliner coupled to a lower end of the back frame, the recliner having a function of switching a rotatable state, in which the back frame is rotatable in seat front-rear directions, and a non-rotatable state; a coupling plate to which the recliner is coupled, the coupling plate being fixed to the rear end of the first side frame; a first fastener to fix the coupling plate to the first side frame by fastening; a second fastener to fix the coupling plate to the first side frame by fastening, the second fastener being arranged in a position displaced toward a seat rear side relative to the first fastener; a first reinforcer fixed to a first portion, of the first side frame, located in an extending direction center thereof to thereby reinforce the first portion; and a second reinforcer fixed to a second portion, of the first side frame, surrounding the second coupling member to thereby reinforce the second portion. The first side frame has a low-rigidity portion provided between the first fastener and the second fastener.

A thickness, parallel to the seat-width direction, of the low-rigidity portion is smaller than a sum of a thickness, parallel to the seat-width direction, of the first portion and a thickness, parallel to the seat-width direction, of a part of the first reinforcer, the part being fixed to the first portion, and than a sum of a thickness, parallel to the seat-width direction, of the second portion and a thickness, parallel to the seat-width direction, of a part of the second reinforcer, the part being fixed to the second portion.

In the above-described vehicle seat, when a force (moment) to rotate the seatback is applied, there is a fear of occurrence of, for example, "deformation like buckling of a portion between the first coupling member and the second coupling member in the first side frame (hereinafter referred to as a first deformation)", "deformation at a portion of the first side frame coupled with the second coupling member (hereinafter referred to as a second deformation)", and so on.

To cope with this, the vehicle seat is provided with the first reinforcer and the second reinforcer, and thus, the first deformation is inhibited by the first reinforcer, and the second deformation is inhibited by the second reinforcer.

Furthermore, for example, in a case where a moment having the same magnitude as the above-described moment is instantaneously applied to the back frame, if the rigidity of the first side frame is excessively high, load by the moment may be concentrated on the recliner, thus resulting in damage to the recliner.

To cope with this, in the vehicle seat, provided between the first fastener and the second fastener in the first side frame is the low-rigidity portion having a thickness smaller than a total thickness of the first portion and the first reinforcer and than a total thickness of the second portion and the second reinforcer.

This allows the energy by the above-described moment to be absorbed by the low-rigidity portion. Therefore, the energy inputted to the recliner is declined, thus inhibiting damage to the recliner.

In one aspect of the present disclosure, the low-rigidity portion may comprise a gap arranged between the first reinforcer and the second reinforcer.

In such a configuration, upon application of the above-described moment to the seatback, an absorption deformation mode is entered in which the first side frame deforms such that the first reinforcer and the second reinforcer contact with each other to cause the gap to disappear, and in which subsequently the first side frame deforms such that the first reinforcer and the second reinforcer are mutually displaced in a width direction thereof.

Therefore, the energy by the moment is allowed to be easily absorbed by the low-rigidity portion, thus inhibiting damage to the recliner.

In one aspect of the present disclosure, in between the first fastener and the second fastener, the gap may be smallest in a distance between the first reinforcer and the second reinforcer. This allows the first side frame to easily deform in the absorption deformation mode, and thus, inhibition of damage to the recliner is facilitated.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
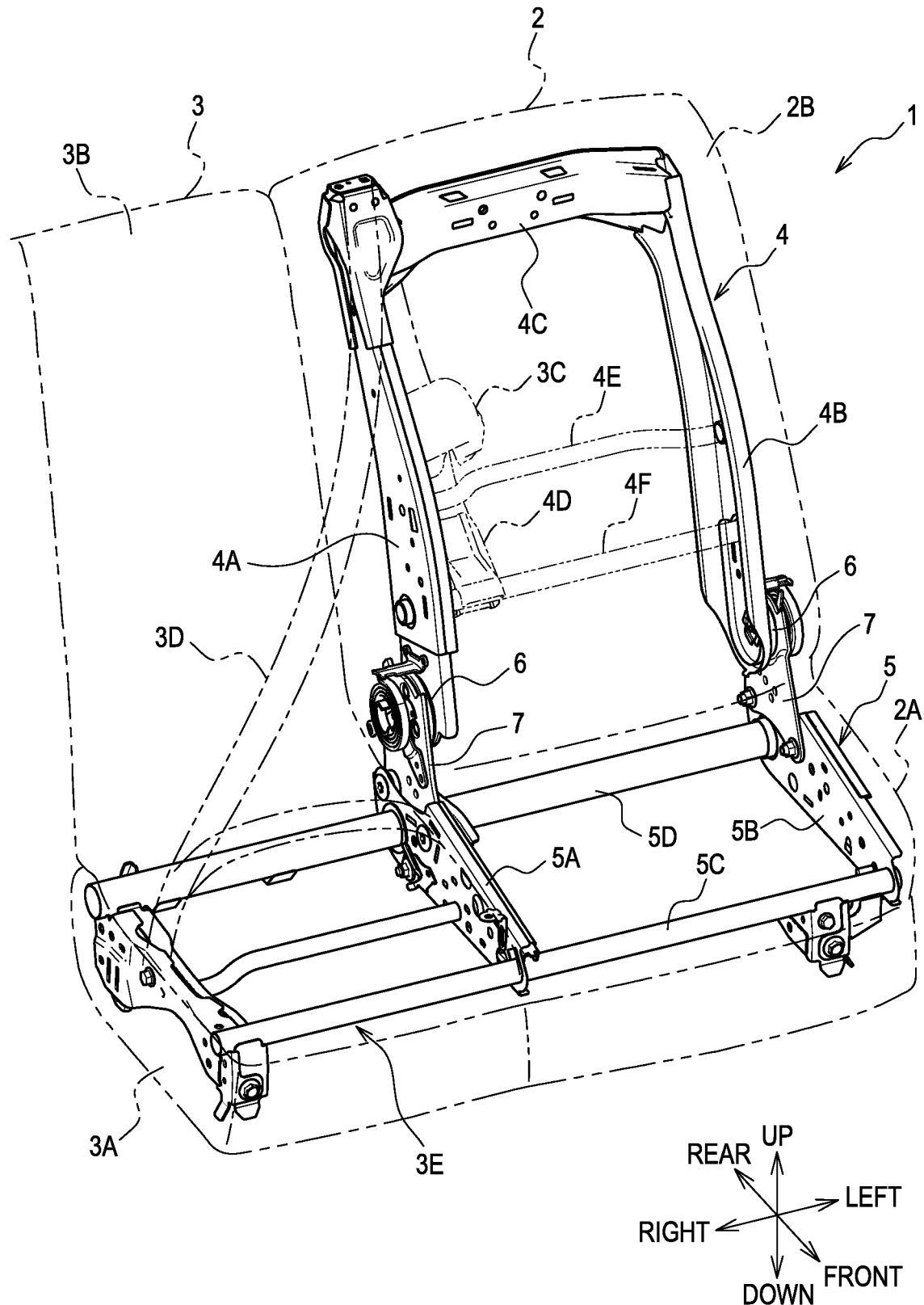
FIG. 1 is a diagram showing a vehicle seat of a first embodiment.

"Embodiments" described below are example embodiments falling within the technical scope of the present disclosure. In other words, invention-specifying matters and so on recited in the appended claims are not limited by specific configurations, structures, and so on indicated in the below-described embodiments.

The present embodiment is directed to a seat mounted to a vehicle, such as an automobile (hereinafter referred to as a vehicle seat). Arrows indicating directions and diagonal lines shown in the drawings are provided for the purpose of easier understanding of, respectively, mutual relationships between the drawings and a shape of each member or portion.

Thus, the vehicle seat is not limited by the directions shown in the drawings. The directions shown in the drawings are based on a state where the vehicle seat is mounted to a vehicle. The drawings with diagonal lines provided thereon are not necessarily sectional views.

At least a member or portion described with a reference numeral assigned thereto is at least one in number unless accompanied by a specifying wording, such as "only one". That is, the member or portion may be two or more in number if no specifying wording, such as "only one", is present. The vehicle seat of the present disclosure includes, as an element, at least a member or portion described with a reference numeral assigned thereto.

First Embodiment

1. Overview of Vehicle Seat

A vehicle seat 1 shown in FIG. 1 is configured with two seats for use in a rear space of a vehicle combined together. Specifically, the vehicle seat 1 comprises a seat 2 (e.g., a left seat) located on one end side in a seat-width direction and a seat 3 located substantially in the center in the seat-width direction (hereinafter also referred to as a center seat 3).

The seat 2 comprises at least a seat cushion 2A and a seatback 2B. The seat 3 comprises at least a seat cushion 3A and a seatback 3B. The seat cushions 2A and 3A each support buttocks of an occupant. The seatbacks 2B and 3B each support a back of the occupant.

Back Frame

A back frame 4 constitutes a framework of the seatback 2B. The back frame 4 is shaped like a portal frame including at least a first side frame 4A, a second side frame 4B, and an upper frame 4C.

The first side frame 4A is arranged at a first end, in the seat-width direction, of the seatback 2B (at a right end in FIG. 1) and extends in an up-down direction. The second side frame 4B is arranged at a second end, in the seat-width direction, of the seatback 2B (at a left end in FIG. 1) and extends in the up-down direction.

The upper frame 4C extends in the seat-width direction to couple an upper end of the first side frame 4A and an upper end of the second side frame 4B to each other. The back frame 4 has a retractor 3C fixed thereto via coupler brackets 4D, 4E, and 4F.

The retractor 3C winds up a seat belt 3D for the center seat 3. When the seat belt 3D is in use, a shoulder strap of the seat belt 3D extends from the upper end of the first side frame 4A toward a right end of the seat cushion 3A.

Cushion Frame

A cushion frame 5 constitutes a framework of the seat cushion 2A. The cushion frame 5 is shaped like a rectangular frame including at least a first side frame 5A, a second side frame 5B, a first coupling member 5C, a second coupling member 5D, a first fastener 51, a second fastener 52, a first reinforcer 54, and a second reinforcer 55 (see FIG. 2).

The first side frame 5A is arranged at a first end, in the seat-width direction, of the seat cushion 2A (at a right end in FIG. 1) and extends in a seat front-rear direction. The second side frame 5B is arranged at a second end, in the seat-width direction, of the seat cushion 2A (at a left end in FIG. 1) and extends in the seat front-rear direction.

The first side frame 5A of the present embodiment is also a part of a cushion frame 3E of the seat cushion 3A. Thus, the first side frame 5A has a structure more rigid than the second side frame 5B.

The first coupling member 5C extends in the seat-width direction to couple a front end of the first side frame 5A and a front end of the second side frame 5B to each other. The second coupling member 5D extends in the seat-width direction to couple a rear end of the first side frame 5A and a rear end of the second side frame 5B to each other.

Coupling Between Cushion Frame and Back Frame

The vehicle seat 1 further comprises two recliners 6 and two coupling plates 7. Each recliner 6 has a function of switching between a rotatable state, in which the back frame 4 is rotatable relative to the cushion frame 5 in the seat front-rear directions, and a non-rotatable state.

A rear end of the cushion frame 5 and a lower end of the back frame 4 are coupled to each other via the two recliners 6. Specifically, a movable portion (not shown) of each recliner 6 is fixed to the lower end of the back frame 4 by welding.

A fixed portion (not shown) of each recliner 6 is fixed to a corresponding coupling plate 7 by welding. Each coupling plate 7 is fixed to the corresponding rear end of the first side frame 5A or of the second side frame 5B.

2. Configuration of First Side Frame

Figure 2:
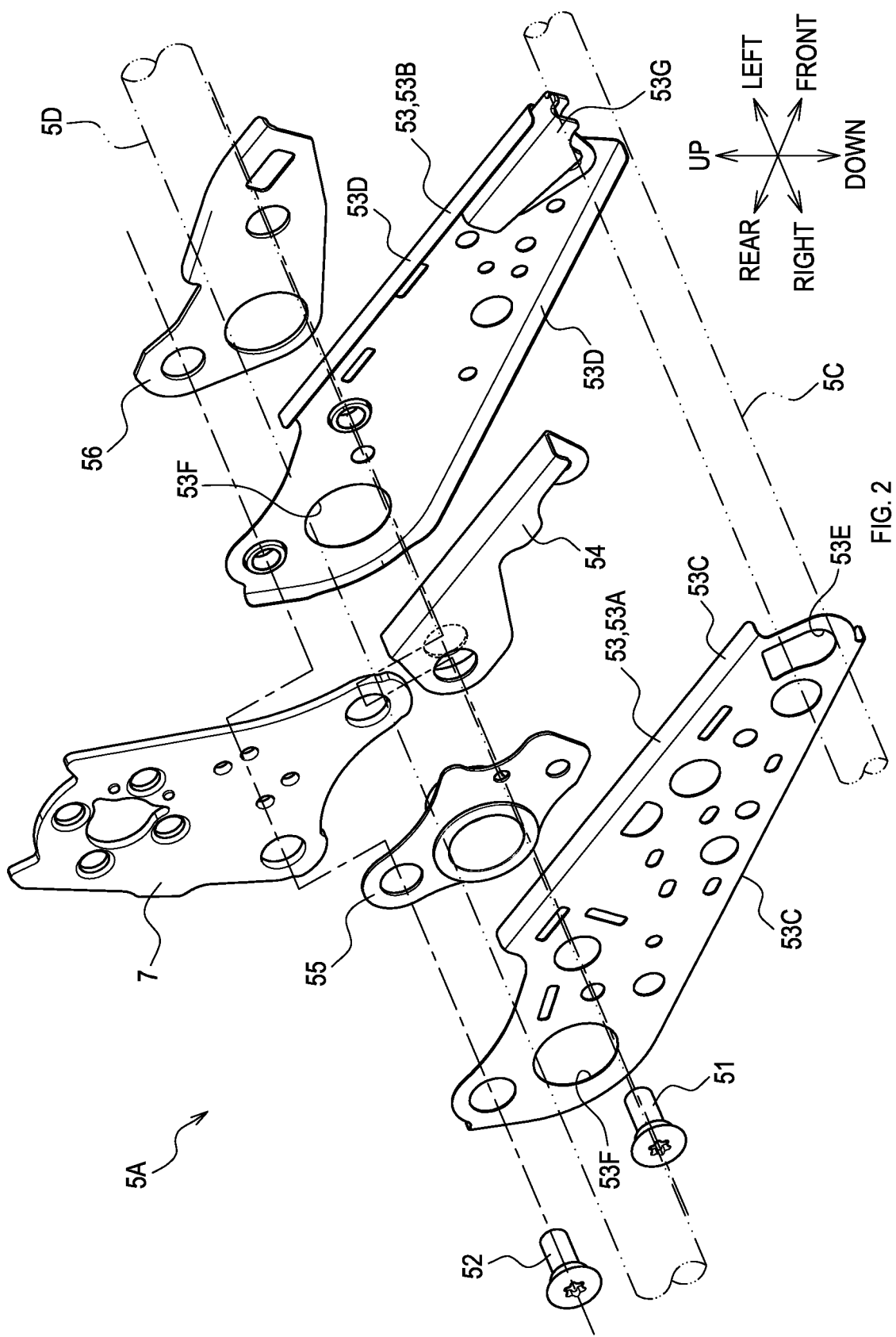
FIG. 2 is an exploded view of a first side frame of the first embodiment.

As shown in FIG. 2, the first side frame 5A is configured with at least a frame body 53.

Frame Body

The frame body 53 extends in the seat front-rear direction to constitute a framework of the first side frame 5A. The frame body 53 of the present embodiment is configured with a first body frame 53A and a second body frame 53B.

The first body frame 53A is arranged on a right side relative to the second body frame 53B. The first body frame 53A has a flange 53C provided at least partially to an outer edge thereof so as to extend toward the second body frame 53B.

The second body frame 53B is arranged closer to the second side frame 5B than the first body frame 53A. The second body frame 53B has a flange 53D provided at least partially to an outer edge thereof so as to extend toward the first body frame 53A.

The first body frame 53A and the second body frame 53B are joined together via the flanges 53C and 53D. Thus, the frame body 53 of the present embodiment is a structure having a hollow and flat shape.

The frame body 53 (the first body frame 53A in the present embodiment) has an insertion hole 53E arranged at an extending direction front end thereof. The insertion hole 53E is a through-hole through which the first coupling member 5C is inserted.

The second body frame 53B has a contact portion 53G provided at a front end thereof. The contact portion 53G contacts with an outer peripheral surface of the first coupling member 5C to thereby position the first coupling member 5C. The contact portion 53G is produced as a part separate from the second body frame 53B, and then fixed to the second body frame 53B by welding.

The frame body 53, in other words the first body frame 53A and the second body frame 53B, has insertion holes 53F arranged at an extending direction rear end thereof. The insertion holes 53F are each a through-hole through which the second coupling member 5D is inserted. The first coupling member 5C and the second coupling member 5D are fixed to the frame body 53 by welding.

In the first side frame 5A of the present embodiment, a third reinforcer 56 is attached on a side surface of the second body frame 53B, which side surface is closer to the second side frame 5B. The third reinforcer 56 is arranged on a third portion surrounding the insertion hole 53F in the second body frame 53B to reinforce the third portion.

First Fastener and Second Fastener

The first fastener 51 and the second fastener 52 are mechanical fasteners, such as screws or caulking pins (screws in the present embodiment), for fixing the coupling plate 7 to the first side frame 5A by fastening. The second fastener 52 is arranged in a position displaced toward a seat rear side relative to the first fastener 51.

The first fastener 51 and the second fastener 52 penetrate the first body frame 53A, the first reinforcer 54, the second reinforcer 55, the coupling plate 7, the second body frame 53B, and the third reinforcer 56 in the seat-width direction.

Figure 7:
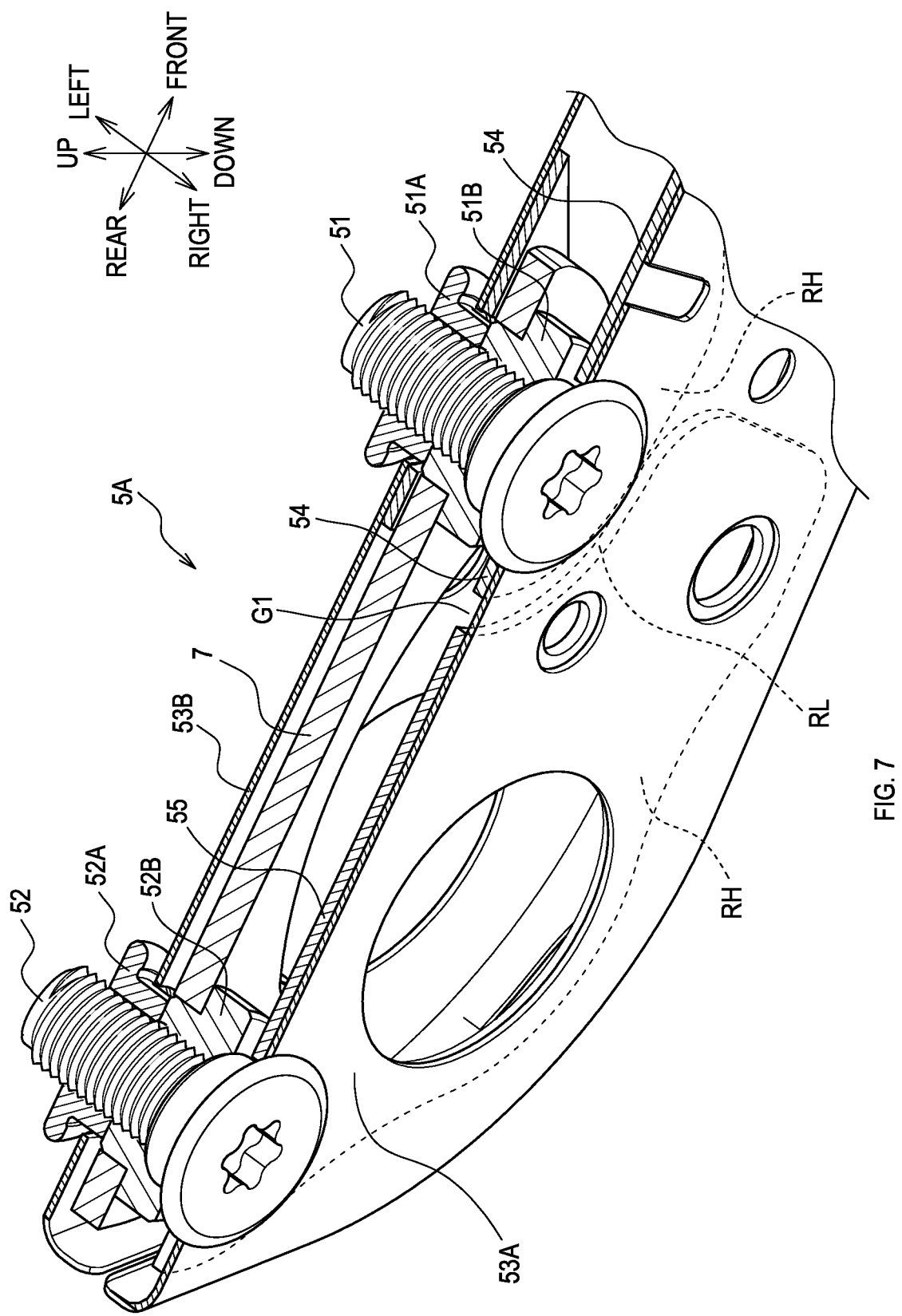
FIG. 7 is a diagram showing a structure of the first side frame of the first embodiment.

As shown in FIG. 7, nuts 51A and 52A are arranged in a region close to the third reinforcer 56. The first fastener 51 and the second fastener 52 are fastened in the nuts 51A and 52A, respectively. Spacers 51B and 52B are provided to secure a distance between the coupling plate 7 and the first body frame 53A.

First Reinforcer and Second Reinforcer

Figure 3:
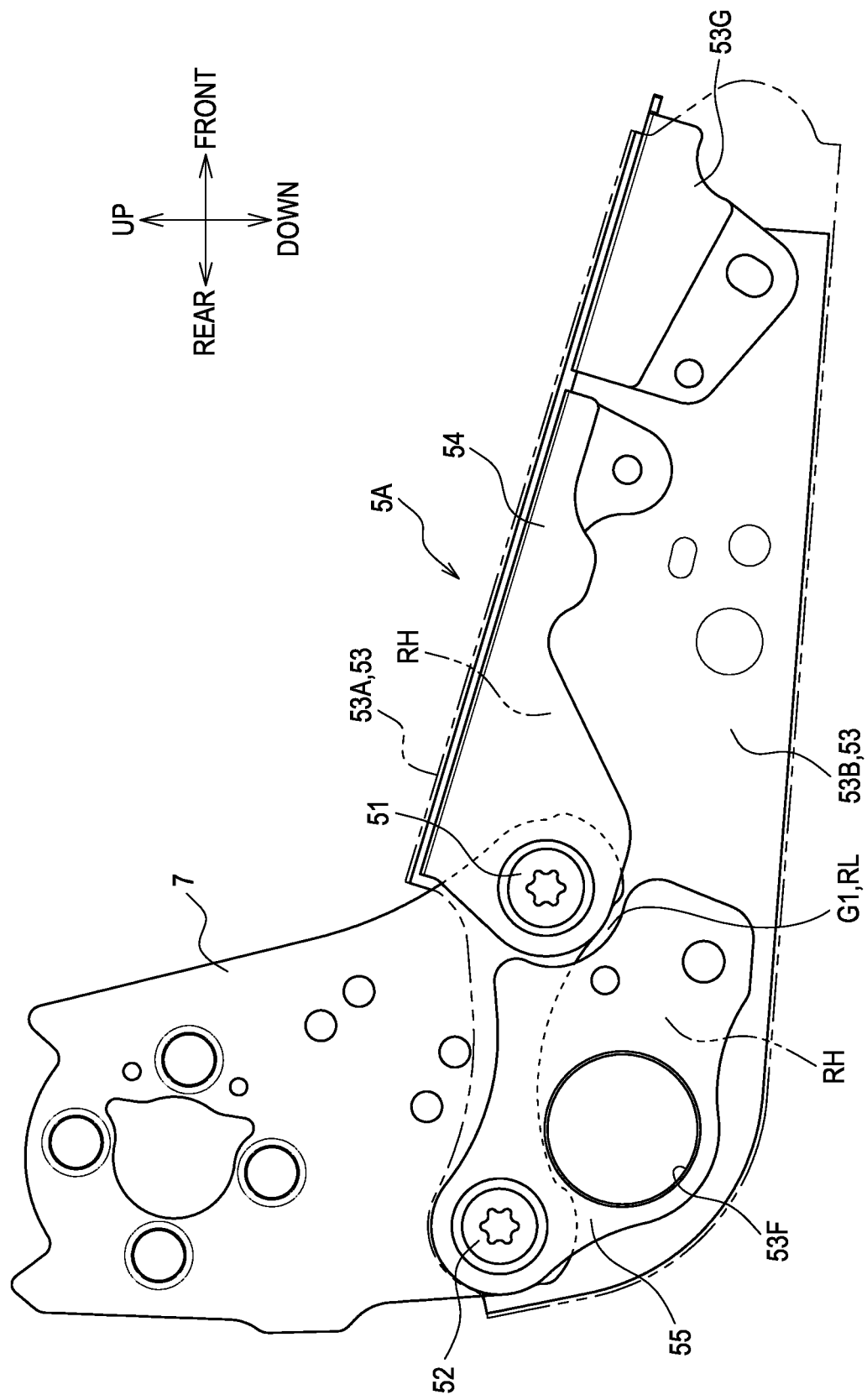
FIG. 3 is a diagram showing the first side frame of the first embodiment.

The first reinforcer 54 and the second reinforcer 55 reinforce the frame body 53, in other words a part of the first side frame 5A. As shown in FIG. 3, the first reinforcer 54 is fixed to a first portion, in the frame body 53, located in an extending direction center thereof, and enhances a flexural rigidity (especially buckling rigidity) of the first portion.

The second reinforcer 55 is fixed to a second portion, in the frame body 53, surrounding the second coupling member 5D (the insertion hole 53F in the first body frame 53A, in the present embodiment), and inhibits the second portion from deforming locally.

The first reinforcer 54 is welded and fixed to the first body frame 53A and to the second body frame 53B. The second reinforcer 55 is welded and fixed to the first body frame 53A. The first fastener 51 penetrates a rear end of the first reinforcer 54. The second fastener 52 penetrates a rear end of the second reinforcer 55.

That is, the first reinforcer 54 and the second reinforcer 55 are each integrated with the first body frame 53A.

Figure 4:
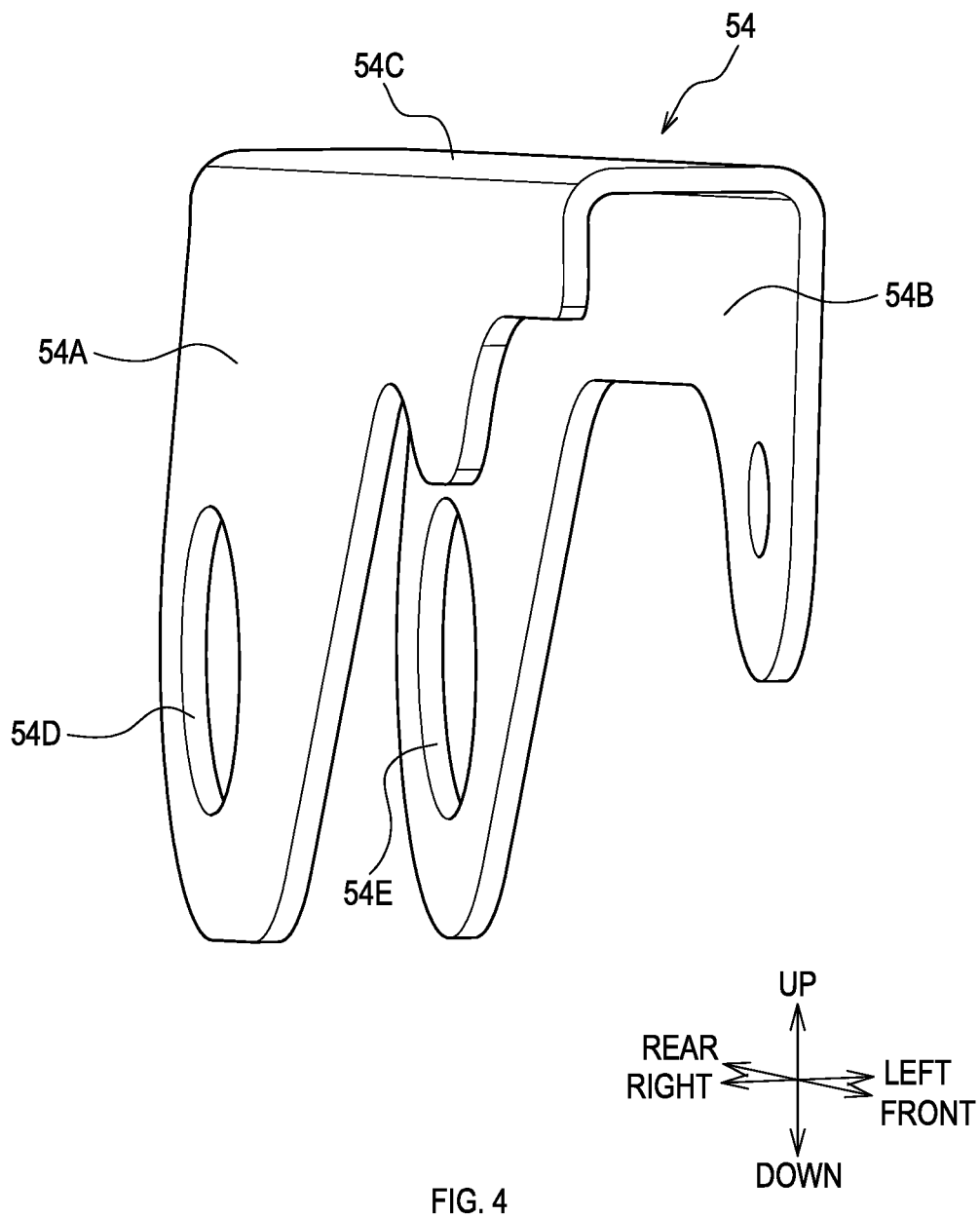
FIG. 4 is a diagram showing a first reinforcer of the first embodiment.

As shown in FIG. 4, the first reinforcer 54 comprises a first wall 54A, a second wall 54B, and a top panel 54C, and has a U-like shape in its cross section. The first wall 54A is joined onto the first body frame 53A.

The second wall 54B is joined onto the second body frame 53B. The first wall 54A and the second wall 54B contain through-holes 54D and 54E, respectively. The through-holes 54D and 54E are where the first fastener 51 passes through.

The top panel 54C connects the first wall 54A and the second wall 54B to each other. In the present embodiment, the first wall 54A, the second wall 54B, and the top panel 54C are formed as one piece by press-working a metal plate.

Figure 5:
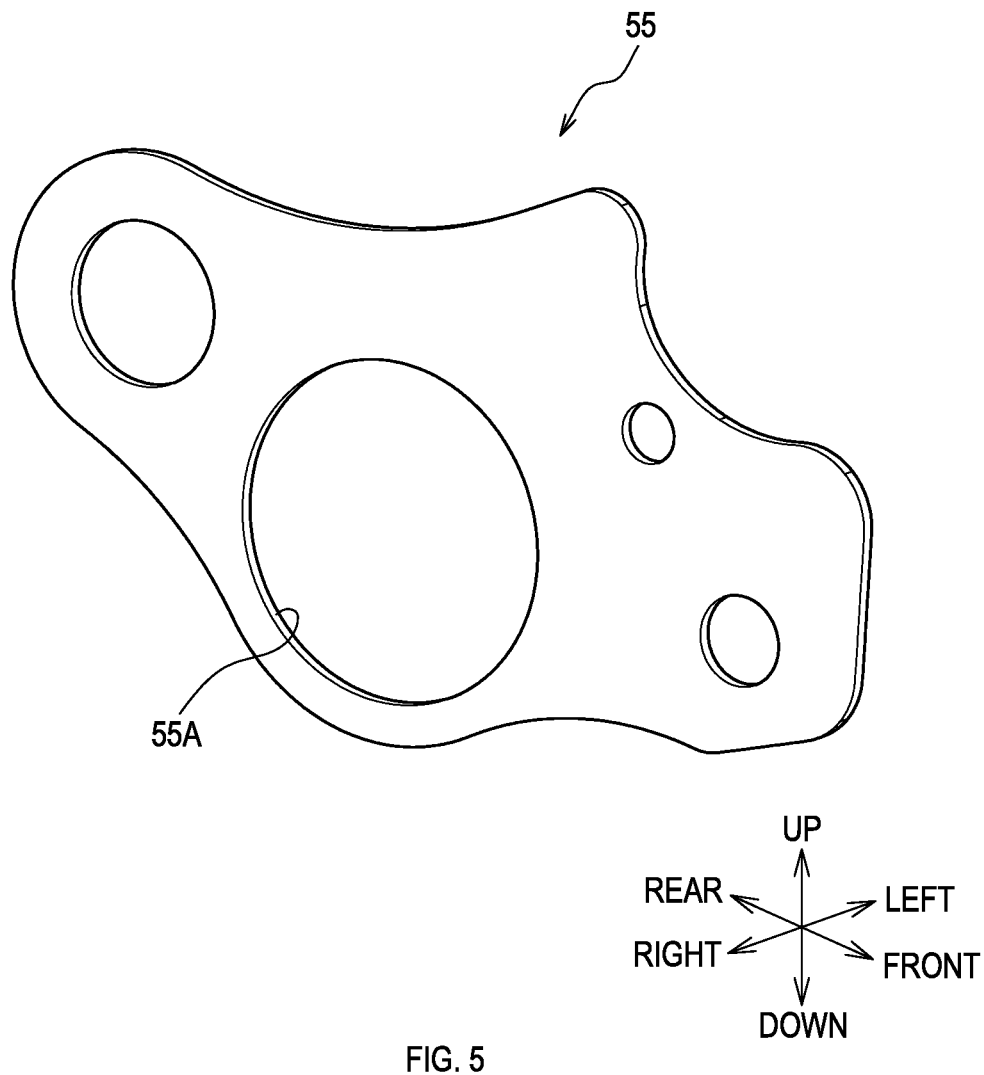
FIG. 5 is a diagram showing a second reinforcer of the first embodiment.

As shown in FIG. 5, the second reinforcer 55 is a plate-shaped member. The second reinforcer 55, being between the first body frame 53A and the coupling plate 7, is joined onto the first body frame 53A. A through-hole 55A is where the second coupling member 5D passes through.

High-Rigidity Portion and Low-Rigidity Portion

Figure 6:
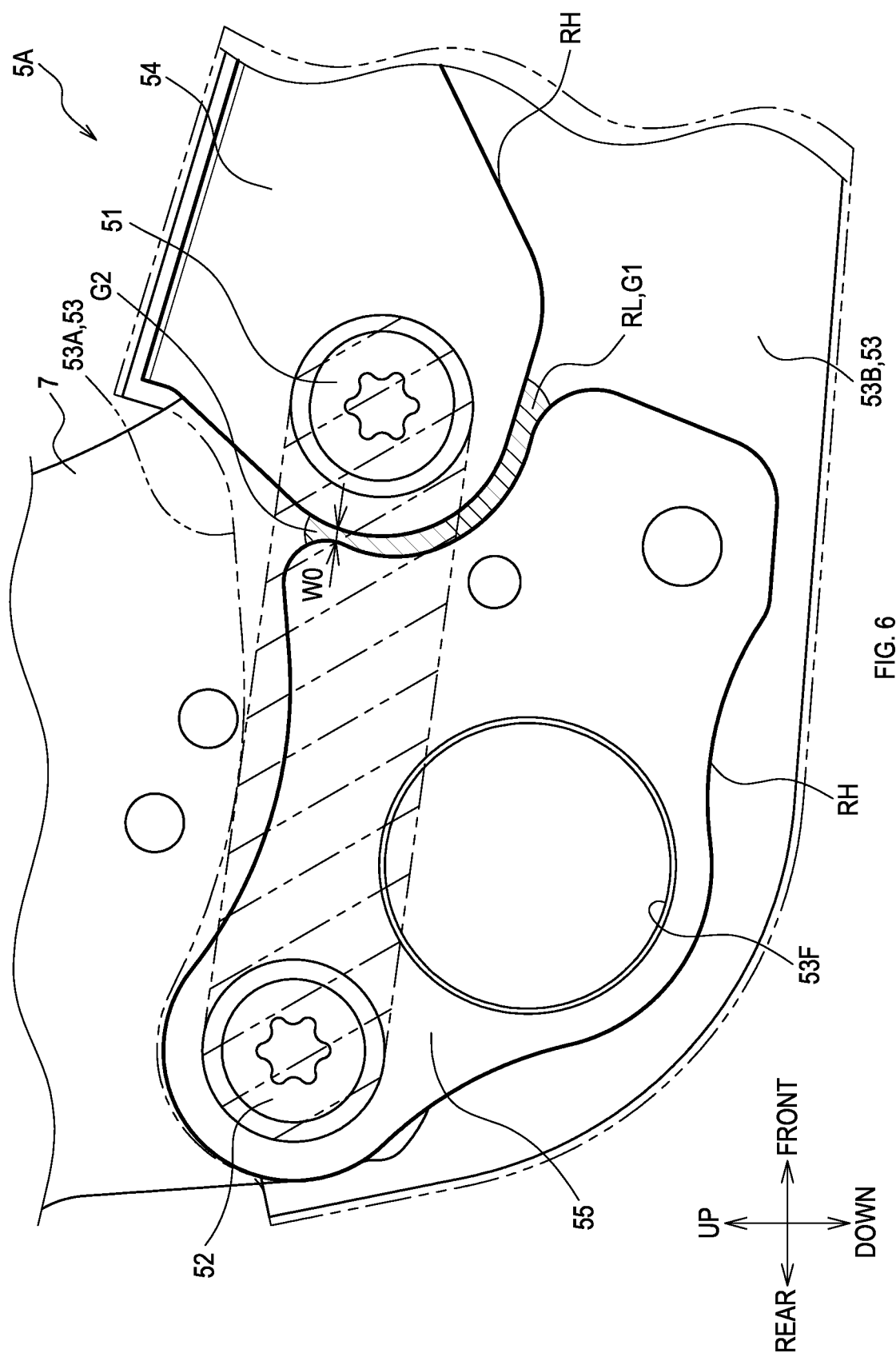
FIG. 6 is a diagram showing the first side frame of the first embodiment.

In the present embodiment, as shown in FIG. 6, the first side frame 5A (the first body frame 53A in the present embodiment) has high-rigidity portions RH and a low-rigidity portion RL (an area hatched with thin lines). The low-rigidity portion RL is provided between the first fastener 51 and the second fastener 52 (i.e., in an area hatched with two-dot chain lines).

The high-rigidity portions RH (portions surrounded by thick solid lines in FIG. 6) are each where the first reinforcer 54 or the second reinforcer 55 is fixed (i.e., the first portion or the second portion, respectively) on the first side frame 5A (the first body frame 53A in the present embodiment).

As shown in FIG. 7, a gap G1 is arranged between the first reinforcer 54 and the second reinforcer 55. The gap G1 extends like a canyon that separates the first reinforcer 54 and the second reinforcer 55 from each other.

In the present embodiment, the low-rigidity portion RL is configured with a portion of the first body frame 53A that includes the gap G1.

The thickness of the low-rigidity portion RL is smaller than a sum of the thickness of the first portion and the thickness of the first reinforcer 54 in the high-rigidity portion RH and than a sum of the thickness of the second portion and the thickness of the second reinforcer 55 in the high-rigidity portion RH. The thickness refers to a dimension parallel to the seat-width direction.

As shown in FIG. 6, in the gap G1, provided between the first fastener 51 and the second fastener 52 is a minimum gap portion G2 where a distance Wo between the first reinforcer 54 and the second reinforcer 55 is smallest. The minimum gap portion G2 of the present embodiment is located substantially on an imaginary line connecting the center of the first fastener 51 and the center of the second fastener 52 to each other.

Second Side Frame

Figure 8:
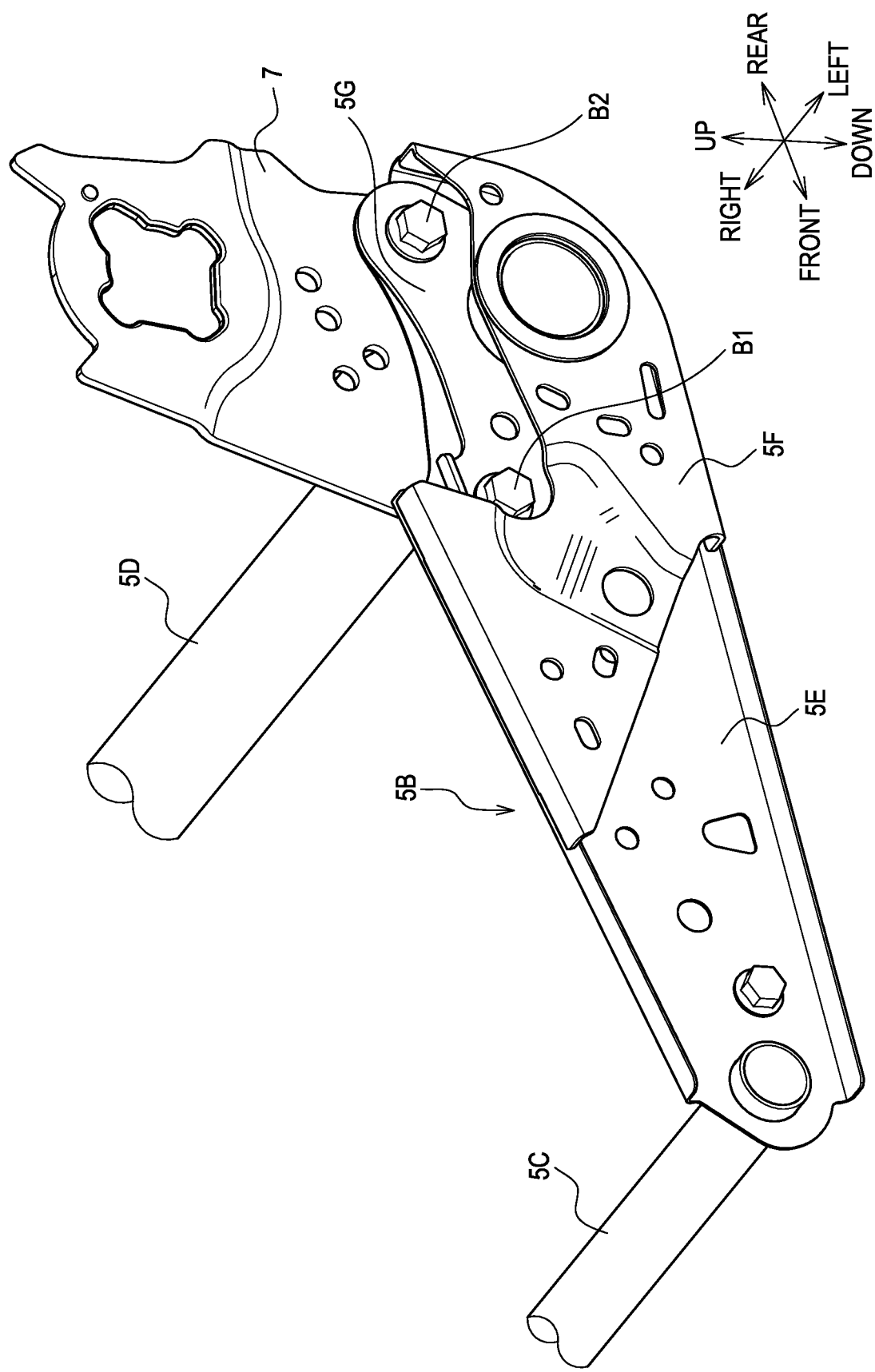
FIG. 8 is a diagram showing a second side frame of the first embodiment.

As shown in FIG. 8, the second side frame 5B is configured with at least a frame body 5E, a reinforcing frame 5F, and a reinforcing member 5G. The frame body 5E extends in the seat front-rear direction to constitute a framework of the second side frame 5B.

The reinforcing frame 5F and the reinforcing member 5G complement the rigidity of the frame body 5E. The reinforcing frame 5F and the reinforcing member 5G are fixed to the frame body 5E by welding. The coupling plate 7 is fixed to the reinforcing member 5G via bolts B1 and B2.

3. Features of Vehicle Seat (Especially First Side Frame) of the Present Embodiment In a state where the seat belt 3D is in use (see FIG. 1), if a large tensile force is applied to the seat belt 3D, a moment (hereinafter referred to as a load moment) is generated which rotates the seatback 2B (the back frame 4) toward a seat front side about a lower end of the seatback 2B.

This results in generating the following: a moment that forcibly rotates the recliner 6; a moment that rotates the coupling plate 7 about a middle portion between the first fastener 51 and the second fastener 52; and a buckling load that compresses a portion between the first coupling member 5C and the second coupling member 5D in the first side frame 5A.

To cope with this, the first reinforcer 54 is provided to the first side frame 5A, thus inhibiting great buckling deformation of the first side frame 5A upon generation of the buckling load.

Moreover, since the second reinforcer 55 is also provided to the first side frame 5A, when the moment that rotates the coupling plate 7 is generated, great deformation of a portion of the first side frame 5A coupled with the second coupling member 5D is inhibited.

Furthermore, for example, in a case where a moment having the same magnitude as the load moment is instantaneously applied to the back frame 4, if the rigidity of the first side frame 5A is excessively high, load by the load moment may be concentrated on the recliner 6, thus resulting in damage to the recliner 6.

To cope with this, the first side frame 5A has the low-rigidity portion RL provided between the first fastener 51 and the second fastener 52. This allows the energy by the load moment to be absorbed by the low-rigidity portion RL. Therefore, the energy inputted to the recliner 6 is declined, thus inhibiting damage to the recliner 6.

Figure 9:
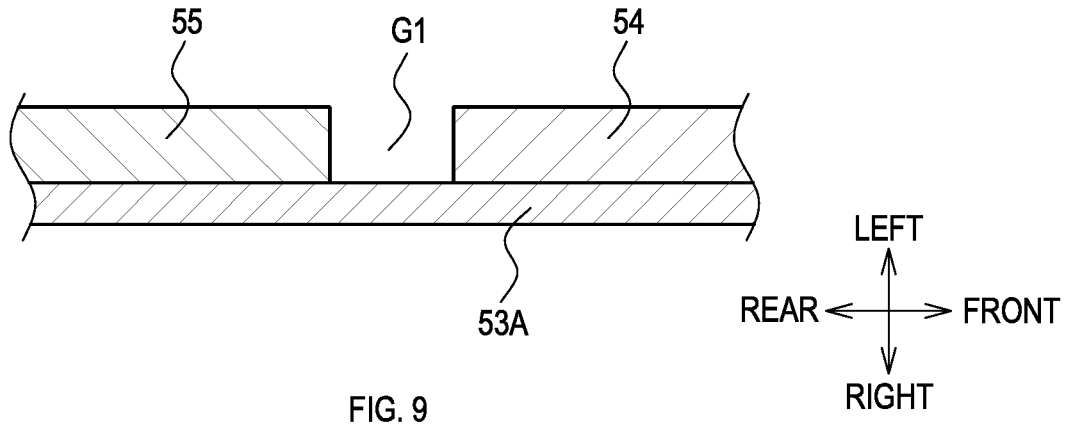
FIG. 9 is a diagram showing a low-rigidity portion of the first side frame of the first embodiment.

Specifically, when the load moment is not applied to the back frame 4, the first reinforcer 54 and the second reinforcer 55 are spaced apart from each other via the gap G1 (see FIG. 9).

Figure 10:
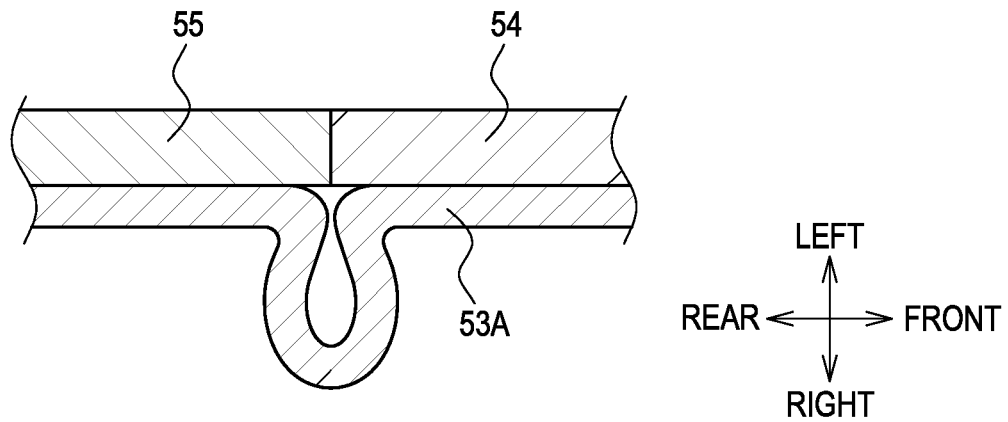
FIG. 10 is a diagram showing an absorption deformation mode of the first side frame of the first embodiment.

Then, upon application of the load moment to the back frame 4, for example, as shown in FIG. 10, the first body frame 53A deforms such that an end of the first reinforcer 54 and an end of the second reinforcer 55 contact with each other.

Figure 11:
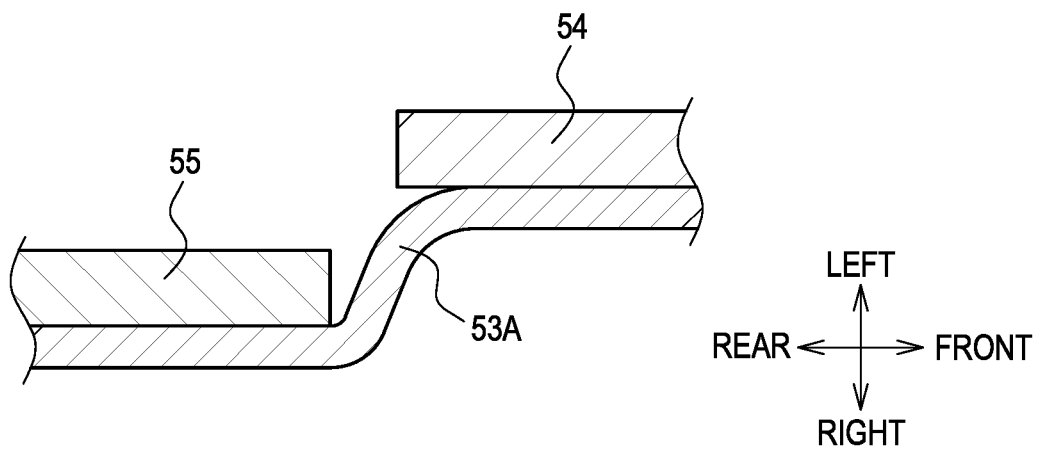
FIG. 11 is a diagram showing the absorption deformation mode of the first side frame of the first embodiment.

At this time, the tensile force generated in the seat belt 3D includes a component of the seat-width direction. Thus, when the first body frame 53A starts to deform, for example, as shown in FIG. 11, the first reinforcer 54 and the second reinforcer 55 are mutually displaced in the seat-width direction to deform the first body frame 53A.

As described so far, since the first body frame 53A deforms more greatly than the first reinforcer 54 and the second reinforcer 55, the energy inputted to the recliner 6 is declined, thus facilitating inhibition of damage to the recliner 6.

In the vehicle seat 1 of the present embodiment, the gap G1 is arranged between the first reinforcer 54 and the second reinforcer 55, and also the low-rigidity portion RL is configured with the portion where the gap G1 is arranged.

In such a configuration, upon application of the load moment to the seatback 2B, an absorption deformation mode is entered in which the first side frame 5A deforms such that the first reinforcer 54 and the second reinforcer 55 contact with each other to cause the gap G1 to disappear as descried above (see FIG. 10), and in which subsequently the first side frame 5A deforms such that the first reinforcer 54 and the second reinforcer 55 are mutually displaced in a width direction thereof (see FIG. 11).

Therefore, in the vehicle seat 1 of the present embodiment, the energy by the load moment is allowed to be easily absorbed by the low-rigidity portion RL, thus facilitating inhibition of damage to the recliner 6.

Further, in the gap G1, the minimum gap portion G2 where the distance Wo is smallest is provided between the first fastener 51 and the second fastener 52. This allows the first side frame 5A to easily deform in the absorption deformation mode, and thus, inhibition of damage to the recliner 6 is facilitated.

Second Embodiment

Figure 12:
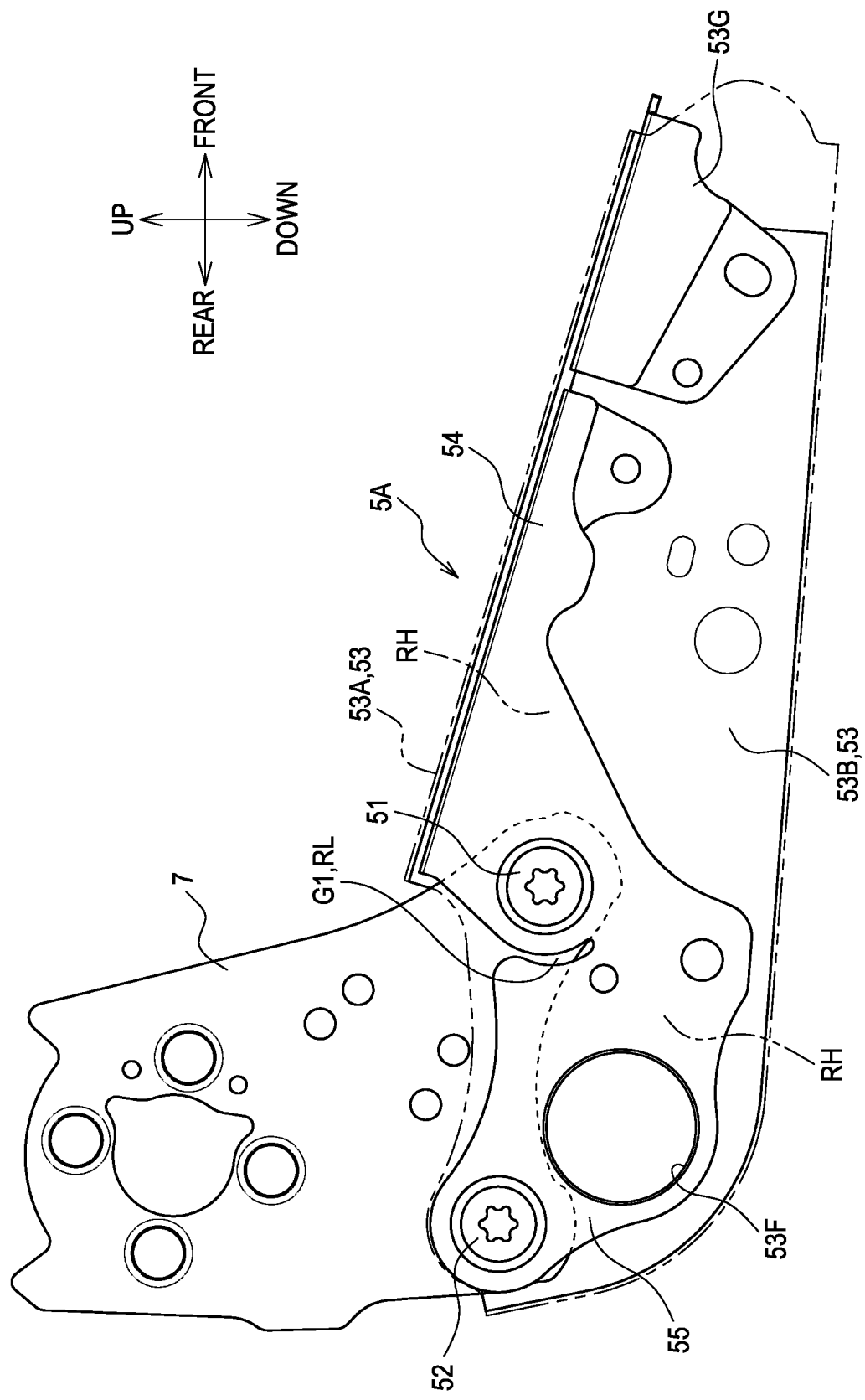
FIG. 12 is a diagram showing a first side frame of a second embodiment.

As shown in FIG. 12, the first side frame 5A of a second embodiment is configured with a one-piece part with the first reinforcer 54 and the second reinforcer 55 continuous with each other.

In FIG. 12, the same elements and so on as in the first embodiment are assigned with the same reference numerals as in the first embodiment. Thus, in the second embodiment, the same explanations are not repeated.

Other Embodiments

The present disclosure is also applicable to, for example, a seat for a single-seater vehicle having one seat.

A cause of generation of an external force to be applied to the vehicle seat is not limited to the tensile force generated in the seat belt 3D.

The low-rigidity portion RL may be configured with a thin-walled portion having a thickness less than the high-rigidity portion RH.

The low-rigidity portion RL may be configured with a portion including the gap G1 having a constant distance between the first reinforcer 54 and the second reinforcer 55.

In the absorption deformation mode, the deformations shown in FIGS. 10 and 11 may progress concurrently.

The present disclosure may also be applied, for example, to seats used in other vehicles, such as railroad vehicles, ships, and aircrafts, and to stationary seats used at theaters, homes, and other places.

Further, the present disclosure may be embodied in various forms if the gist of the disclosure described in the above embodiments is met, and is not limited to the above embodiments. Thus, a configuration may be adopted in which at least two of the above embodiments are combined together, or in which any of the elements shown in the drawings and/or any of the elements described with reference numerals assigned thereto, in the above embodiments, are/is not employed.

What is claimed is:

1. A vehicle seat with a seat cushion and a seatback, the vehicle seat comprising:
   a first side frame constituting a part of a framework of the seat cushion and extending in a seat front-rear direction, the first side frame being arranged at a first end, in a seat-width direction, of the seat cushion;
   a second side frame constituting a part of the framework of the seat cushion and extending in the seat front-rear direction, the second side frame being arranged at a second end, in the seat-width direction, of the seat cushion;
   a first coupling member coupling a front end of the first side frame and a front end of the second side frame to each other, the first coupling member extending in the seat-width direction;
   a second coupling member coupling a rear end of the first side frame and a rear end of the second side frame to each other, the second coupling member extending in the seat-width direction;
   a back frame constituting a framework of the seatback;
   a recliner coupled to a lower end of the back frame, the recliner having a function of switching a rotatable state, in which the back frame is rotatable in seat front-rear directions, and a non-rotatable state;
   a coupling plate to which the recliner is coupled, the coupling plate being fixed to the rear end of the first side frame;
   a first fastener to fix the coupling plate to the first side frame by fastening;
   a second fastener to fix the coupling plate to the first side frame by fastening, the second fastener being arranged in a position displaced toward a seat rear side relative to the first fastener;
   a first reinforcer fixed to a first portion, of the first side frame, located in an extending direction center thereof to thereby reinforce the first portion; and
   a second reinforcer fixed to a second portion, of the first side frame, surrounding the second coupling member to thereby reinforce the second portion,
   wherein the first side frame has a low-rigidity portion provided between the first fastener and the second fastener, and
   wherein a thickness, parallel to the seat-width direction, of the low-rigidity portion is smaller than a sum of a thickness, parallel to the seat-width direction, of the first portion and a thickness, parallel to the seat-width direction, of a part of the first reinforcer, the part being fixed to the first portion, and than a sum of a thickness, parallel to the seat-width direction, of the second portion and a thickness, parallel to the seat-width direction, of a part of the second reinforcer, the part being fixed to the second portion.

2. The vehicle seat according to claim 1,
   wherein the low-rigidity portion comprises a gap arranged between the first reinforcer and the second reinforcer.

3. The vehicle seat according to claim 2,
   wherein, in between the first fastener and the second fastener, the gap is smallest in a distance between the first reinforcer and the second reinforcer.

* * * * *